Oct. 26, 1926.

S. MEYROWITZ 1,604,529

VALVE FOR WATER FAUCETS

Filed May 25, 1925

INVENTOR
Samuel Meyrowitz
BY
ATTORNEY

Patented Oct. 26, 1926.

1,604,529

UNITED STATES PATENT OFFICE.

SAMUEL MEYROWITZ, OF BROOKLYN, NEW YORK.

VALVE FOR WATER FAUCETS.

Application filed May 25, 1925. Serial No. 32,624.

This invention relates to improvements in valves, particularly valves used with water faucets, or the like, and it is the principal object of the invention to provide a valve having a substantially ball-shaped member fitting tightly but not rigidly in the valve head, and to be opened and closed by means of a threaded collar operated by the faucet handle.

Another object of the invention is the provision of a ball shaped member resting tightly on its seat in the valve head by the intermediary of a novel multi-partite washer arrangement.

A further object of the invention is the provision of a valve having a bi-partite ball seat, the parts of which are removably held together.

A still further object of the invention is the provision of a valve of simple and inexpensive construction providing at all times a water tight closure at the valve seat as well as at the cap through which the operating handle stem is passed.

These and other objects and advantages of my invention will become more fully known, as the description thereof proceeds, and will then be more specifically pointed out in the appended claims.

In the accompanying drawing forming a material part of this disclosure:

Figure 1:
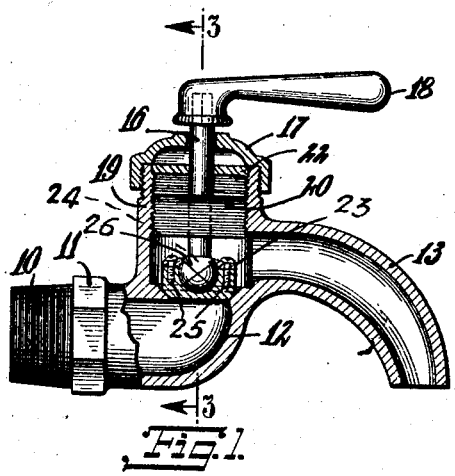
Fig. 1 is a sectional side elevation of a valve constructed according to the present invention.
Figure 2:
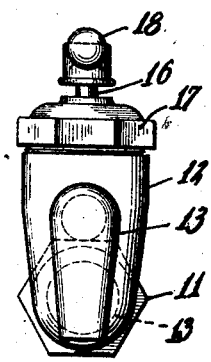
Fig. 2 is a front end view of the same.
Figures 3, 5:
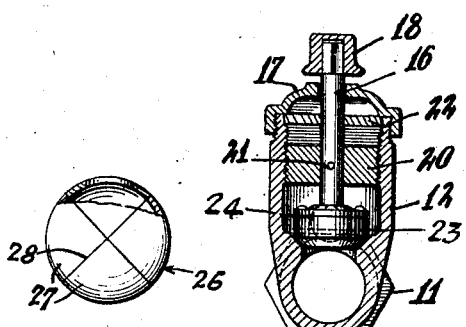
Fig. 3 is a section on line 3—3 of Figure 1.
Fig. 5 is an enlarged detailed exterior view of the valve head ball washer, with a portion thereof broken away so that the interior may be viewed.
Figure 4:
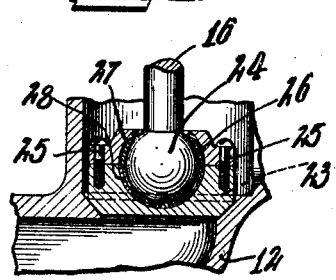
Fig. 4 is a fragmentary enlarged detail view of the valve head, and adjacent parts.

A faucet having the customary threaded end 10 for attachment to a water supply pipe and nut 11 formed therewith for operation by a suitable tool, has a hollow body 12 and a water discharge pipe 13.

Within the body 12 is a valve head 23 which has a recess for receiving a ball shaped member 24 at the end of the stem 16, which extends through the customary threaded cap 17 screwed upon the upper end of body 12, and carries at its extreme outer end an operating handle 18. Within the neck part 19, of the body 12, equipped with external and internal threads, a threaded plug 20 is secured to the stem 16 as indicated at 21, while the customary washer 22 closes the neck part 19 at the top.

The valve head 23 for receiving the ball shaped member 24 is made in two parts connected by means of screws 25, or the like, and the valve head carries a washer 26 having substantially the form of the ball shaped member and interposed between the ball shaped member and valve head. This washer 26, consists of a plurality of parts 27 made of felt or similar material, connected at their meeting ends, as at 28. This washer forms between valve head and ball member a very tight fit, but this fit has a little elasticity due to the give in the felt washer.

The operation of my device will be quite clear from the above description and needs no further explanation.

It is to be understood that while I have shown and described the preferred form of my valve construction, as an example, of the many ways in which the same may be made, changes may be made in its construction, as fall within the scope of the appended claims without departure from the spirit of the invention.

Having thus described my invention, what I claim as new, and desire to secure by Letters Patent, is:

1. In combination with the body of a faucet, a stem, and a valve head having a recess receiving a ball-shaped member depending from said stem and covered with a spherical washer forming a very tight, but slightly elastic joint between said valve head and ball-shaped member due to the give in the washer.

2. In combination with the body of a faucet, a valve head having a recess receiving a ball-shaped member covered with a spherical washer forming a very tight, but slightly elastic joint between said valve head and ball-shaped member due to the give in the washer, said member being at the end of the valve stem.

3. In combination with the body of a faucet, a stem, and a valve head formed of a number of parts fastened together and having a recess receiving a ball-shaped member depending from said stem and covered with a spherical washer forming a very tight, but slightly elastic joint between said valve head and ball-shaped member due to the give in the washer.

4. In combination with the body of a faucet, a stem, and a valve head formed of a number of parts fastened together and having a recess receiving a ball-shaped member depending from said stem and covered with a spherical felt washer forming a very tight, but slightly elastic joint between said valve head and ball-shaped member due to the give in the washer.

5. In combination with the body of a faucet, a stem, and a valve head formed of a number of parts fastened together and having a recess receiving a ball-shaped member depending from said stem and covered with a spherical slightly elastic washer forming a very tight, but slightly elastic joint between said valve head and ball-shaped member due to the give in the washer.

6. In a device of the class described, a stem, and a valve head having a recess receiving a ball-shaped member depending from said stem and covered with a spherical washer forming a very tight, but slightly elastic joint between said valve head and ball-shaped member due to the give in the washer.

7. In a device of the class described, a stem, and a valve head formed of a number of parts fastened together and having a recess receiving a ball-shaped member depending from said stem and covered with a spherical felt washer forming a very tight, but slightly elastic joint between said valve head and ball-shaped member due to the give in the washer.

8. In a device of the class described, a stem, and a valve head formed of a number of parts fastened together and having a recess receiving a ball-shaped member depending from said stem and covered with a spherical slightly elastic washer forming a very tight, but slightly elastic joint between said valve head and ball-shaped member due to the give in the washer.

9. In a device of the class described, a faucet body provided internally with a valve seat, a valve head having a recess for receiving a ball-shaped member, a valve stem provided at the lower end with a ball-shaped member engageable in said recess of the valve head, a spherical washer positioned between the wall of the recess of the valve head and the ball-shaped member of valve stem, a plug fixed to said valve stem and provided with male threads engageable with complementary threads in the faucet body, said faucet body having a washer-closed neck portion, a cap secured over said neck portion, and a handle on the end of valve stem which projects through said latter washer and cap.

In testimony whereof I have affixed my signature.

SAMUEL MEYROWITZ.